United States Patent
Hatanaka

(10) Patent No.: US 12,275,133 B2
(45) Date of Patent: Apr. 15, 2025

(54) ROBOT CONTROL DEVICE

(71) Applicant: FANUC CORPORATION, Yamanashi (JP)

(72) Inventor: Kokoro Hatanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 215 days.

(21) Appl. No.: 17/906,574

(22) PCT Filed: Jun. 9, 2021

(86) PCT No.: PCT/JP2021/021984
§ 371 (c)(1),
(2) Date: Sep. 16, 2022

(87) PCT Pub. No.: WO2021/256355
PCT Pub. Date: Dec. 23, 2021

(65) Prior Publication Data
US 2023/0131173 A1    Apr. 27, 2023

(30) Foreign Application Priority Data

Jun. 16, 2020 (JP) .................................. 2020-103676

(51) Int. Cl.
*B25J 13/08*    (2006.01)
*B25J 19/04*    (2006.01)

(52) U.S. Cl.
CPC ............. *B25J 13/084* (2013.01); *B25J 19/04* (2013.01)

(58) Field of Classification Search
CPC ........ B25J 13/084; B25J 19/04; B25J 9/1605; B25J 13/085; B25J 9/1674; G05B 2219/40599
See application file for complete search history.

(56) References Cited

U.S. PATENT DOCUMENTS

2004/0244505 A1* 12/2004 Takenaka ............. B62D 57/032
73/862.541
2008/0255772 A1* 10/2008 Sjostrand ............... B25J 9/1674
702/34

(Continued)

FOREIGN PATENT DOCUMENTS

CN     106737667 A   *  5/2017
CN     108789403 A   * 11/2018  .............. B25J 13/00

(Continued)

OTHER PUBLICATIONS

WO-2013176229-A1 translation (Year: 2013).*

(Continued)

*Primary Examiner* — Kyle T Johnson
(74) *Attorney, Agent, or Firm* — Studebaker Brackett PLLC

(57) ABSTRACT

The objective of the present invention is to allow a user to recognize, at a glance, the degree to which deterioration is occurring to a specific torque sensor from among torque sensors provided for an articulated arm of a robot. In the control device for a robot provided with sensors each of which detects an external force torque about a joint, the objective is achieved by providing a display device which displays, together with 3D graphics of a robot body, a warning icon in color at a mounted location of a deteriorated torque sensor, and changes the color according to the degree of deterioration.

7 Claims, 7 Drawing Sheets

(56) References Cited

U.S. PATENT DOCUMENTS

| | | | |
|---|---|---|---|
| 2009/0326556 A1* | 12/2009 | Diolaiti | A61B 1/00154 |
| | | | 606/130 |
| 2013/0345872 A1* | 12/2013 | Brooks | B25J 9/1676 |
| | | | 700/264 |
| 2014/0379128 A1* | 12/2014 | Ishikawa | G05B 19/406 |
| | | | 700/250 |
| 2017/0136627 A1* | 5/2017 | Takaichi | B25J 9/1694 |
| 2018/0133901 A1* | 5/2018 | Kuno | G01L 5/0061 |
| 2019/0105777 A1* | 4/2019 | Dalley | B25J 9/1615 |
| 2019/0389066 A1* | 12/2019 | Jung | B25J 9/163 |
| 2019/0392644 A1* | 12/2019 | Keselman | B25J 9/1674 |
| 2020/0241502 A1* | 7/2020 | Nakanishi | G06Q 10/06 |
| 2021/0039124 A1* | 2/2021 | Jones | B05B 12/004 |
| 2022/0410395 A1* | 12/2022 | Sugaya | B25J 9/1605 |
| 2023/0131173 A1* | 4/2023 | Hatanaka | B25J 13/084 |
| | | | 700/260 |
| 2024/0009838 A1* | 1/2024 | Sugaya | B25J 9/1605 |

FOREIGN PATENT DOCUMENTS

| | | | | | |
|---|---|---|---|---|---|
| JP | H05-158526 | A | | 6/1993 | |
| JP | 2011-131335 | A | | 7/2011 | |
| JP | 2012-014295 | A | | 1/2012 | |
| JP | 2014-201307 | A | | 10/2014 | |
| JP | 2016-085501 | A | | 5/2016 | |
| JP | 2016-146209 | A | | 8/2016 | |
| JP | 2017-177290 | A | | 10/2017 | |
| JP | 2018-040621 | A | | 3/2018 | |
| JP | 2019-081209 | A | | 5/2019 | |
| JP | 2022012260 | A | * | 1/2022 | |
| KR | 20160118384 | A | * | 10/2016 | |
| KR | 10-2017-0065874 | A | | 6/2017 | |
| KR | 20210070677 | A | * | 6/2021 | |
| WO | WO-2013176229 | A1 | * | 11/2013 | B25J 19/0062 |
| WO | 2016/155787 | A1 | | 10/2016 | |
| WO | WO-2016189584 | A1 | * | 12/2016 | B25J 13/085 |

OTHER PUBLICATIONS

KR-20160118384-A translation (Year: 2016).*
CN-106737667-A translation (Year: 2017).*
CN-108789403-A translation (Year: 2018).*
KR-20210070677-A translation (Year: 2021).*
JP-2022012260-A translation (Year: 2022).*
WO-2016189584-A1 translation (Year: 2016).*
Towards manufacturing robotics accuracy degradation assessment: A vision-based data-driven implementation (Year: 2021).*
Accuracy Degradation Analysis for Industrial Robot Systems (Year: 2017).*
International Search Report issued in PCT/JP2021/021984; mailed Aug. 31, 2021.

* cited by examiner

EXAMPLE OF ACQUIRED DATA AND IDENTIFIED D

EXAMPLE OF IDENTIFIED D
···ARM TO WHICH NO TORQUE THAT OCCURS
DUE TO GRAVITY IS APPLIED

CAUTION LEVEL, WARNING LEVEL

ROBOT CONTROL DEVICE

TECHNICAL FIELD

The present invention relates to a robot provided with an articulated arm, and particularly to a robot provided with torque sensors on an articulated arm.

BACKGROUND ART

Conventionally, such robots each provided with an articulated arm have been developed to detect torque that the articulated arm of the robot receives externally and allow an operator to appropriately perform operation by taking into account the torque that the articulated arm receives externally. Patent Document 1 describes one that displays, on a display part, together with an image of an articulated arm of a robot, which has been captured by a camera, an icon representing torque detected by a torque detector provided to the articulated arm.

Patent Document 1: Japanese Unexamined Patent Application, Publication No. 2019-81209

DISCLOSURE OF THE INVENTION

Problems to be Solved by the Invention

In a torque sensor configured to detect torque that an articulated arm of a robot receives externally, there is normally an error within an allowable range from its manufacturing stage. Therefore, there is an offset added to an output value of the torque. Furthermore, since the torque sensor deteriorates as its use time extends, the value of an offset amount may increase. Therefore, conventionally, the allowable value of torque offset was predetermined as a part of a product specification of a torque sensor, allowing a user to replace the torque sensor with a new one when a detected offset amount exceeds the allowable value.

With such a conventional method in which it is specified that a user is to replace a torque sensor with a new one when a detected offset amount exceeds an allowable value, it has been necessary that the user periodically detects (measures) the offset amount, inefficiently increasing a user's workload. Furthermore, there has been such an issue that, even if the torque offset amount of the entire articulated arm could be recognized, it has been difficult to determine at which joint the torque offset amount has exceeded the allowable value, i.e., it has been difficult to recognize, at a glance, which of the torque sensors at the joints had deteriorated.

Therefore, an object of the present invention is, for torque sensors provided to an articulated arm of a robot, to allow a user to recognize, at a glance, which of the torque sensors on the articulated arm has deteriorated and to what degree the torque sensor has deteriorated.

Means for Solving the Problems

To solve the issue described above, a robot control device according to the present disclosure is such a robot control device for a robot provided with sensors each configured to detect torque of an external force about a joint, and is such a robot control device including a display device configured to display, together with 3D graphics of a main body of the robot, a warning icon in color at a mounted location of a deteriorated torque sensor from among the torque sensors, and to change the color according to a degree of deterioration.

Effects of the Invention

With the robot control device according to the present disclosure, it is possible to allow a user to intuitively recognize, at a glance, information on which of the torque sensors at the joints of the articulated arm of the robot has deteriorated and to what degree the torque sensor has deteriorated.

PREFERRED MODE FOR CARRYING OUT THE INVENTION

Embodiments of the present disclosure will now be described herein in detail with reference to the accompanying drawings.

Figure 1:
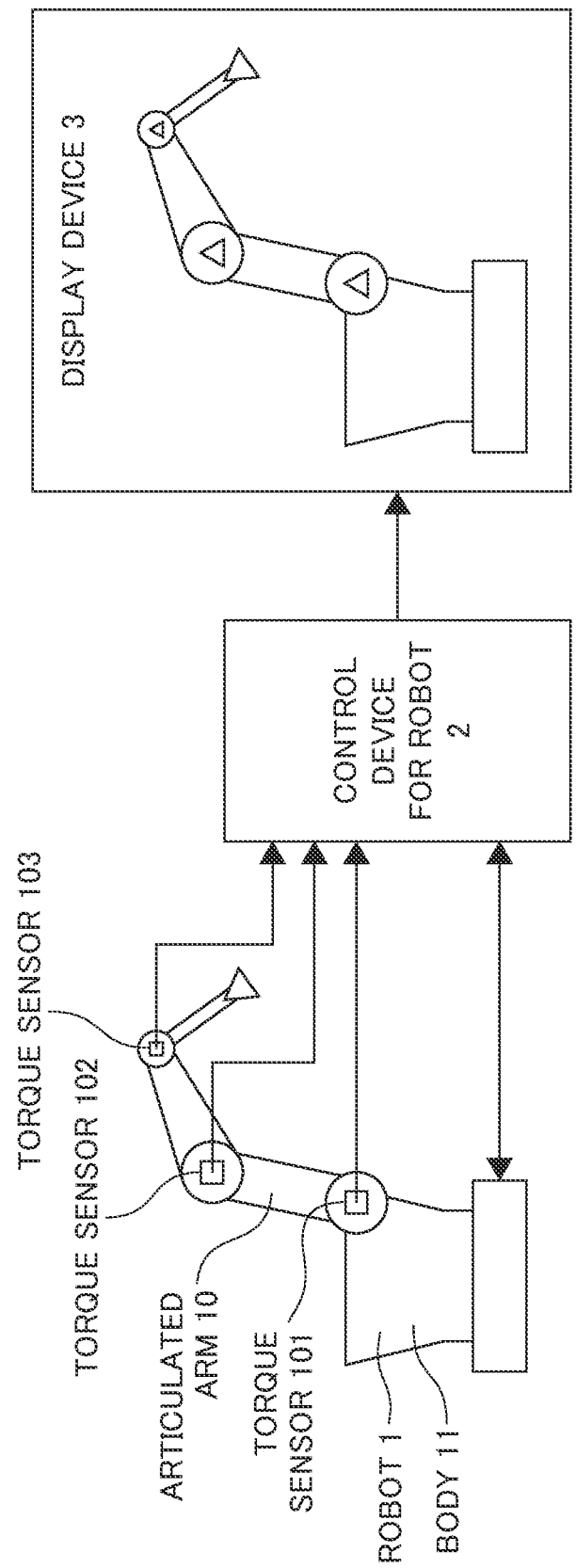
FIG. 1 is a configuration diagram of a robot system according to the present disclosure.

FIG. 1 is a configuration diagram of a robot system common to the embodiments of the present disclosure. A robot 1 illustrated in FIG. 1 is an articulated type robot where an articulated arm 10 such as a six-axis vertical articulated arm or a four-axis vertical articulated arm extends from a body 11. The articulated arm 10 is moved by servo motors 12 (FIG. 2) that are each built into and disposed on the robot 1 and correspond to joints. When the articulated arm 10 raises and moves an object, or comes into contact with another member, it receives torque externally. The torque that has been received externally is distributed to the joints of the articulated arm 10 according to the form of the articulated arm 10 at that time and a direction of the torque that has been received. Torque sensors 101, 102, 103 are respectively provided at the joints of the articulated arm 10, making it possible to detect (measure) torque that the joints receive.

A control device 2 is configured to control operation of the robot 1 and to control contents that a display device 3 displays. A movement command calculated for the robot 1 by the control device 2 is provided to the robot 1 to cause the servo motors 12 (FIG. 2) built into the robot 1 to operate and move the articulated arm 10 for various tasks. Output values from the torque sensors 101, 102, 103 disposed at the joints of the articulated arm 10 are sent to the control device 2 for processing, and resultant data is sent to and displayed on the display device 3.

Figure 2:
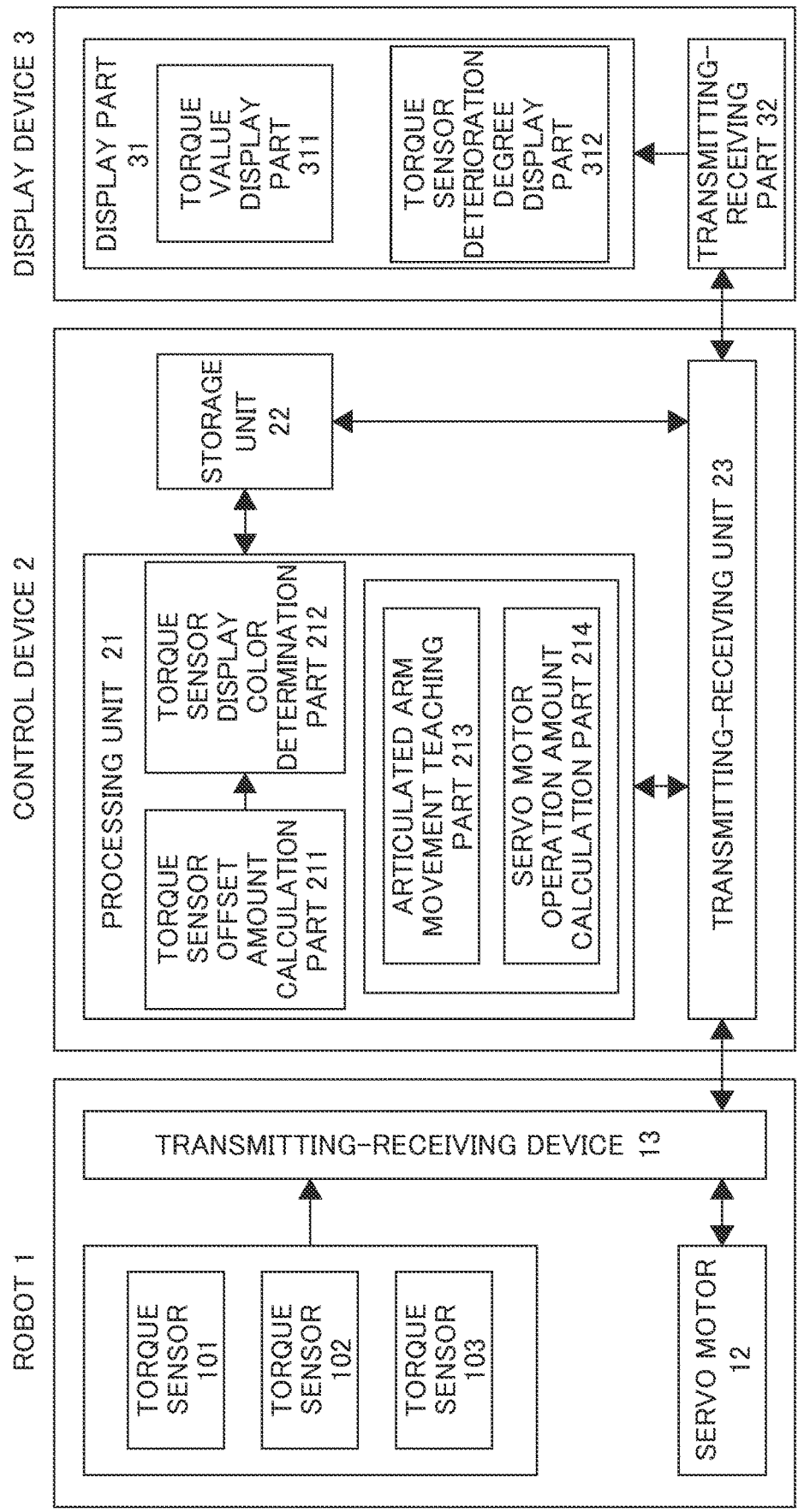
FIG. 2 is a block diagram illustrating a relationship of sending and receiving signals when controlling the robot according to the present disclosure.

FIG. 2 is a block diagram illustrating a relationship of sending and receiving signals between the control device 2 and the robot 1, between the control device 2 and the display device 3, and inside the robot 1, the control device 2, and the display device 3, respectively. The control device 2 has a hardware configuration including a processing unit (CPU) 21 including a microprocessor, for example, a storage unit 22 including a memory member such as random access memory (RAM), read-only memory (ROM), electrically erasable programmable read-only memory (EEPROM), and flash memory, and a transmitting-receiving unit 23. An articulated arm movement teaching part 213 and a servo motor operation amount calculation part 214 in the processing unit 21 of the control device 2 calculate operation amounts (rotation numbers) for the servo motors 12 from teaching data for movement of the articulated arm 10, calculate operation commands for the servo motors 12 of the robot 1, and send the calculated operation commands to the robot 1 via the transmitting-receiving unit 23. The servo motors 12 of the robot 1 operate according to the operation commands sent from the control device 2, and provide, as feedback, data (rotation numbers) as a result of operation to the control device 2 via a transmitting-receiving device 13 of the robot 1. Furthermore, output data of the torque sensors 101, 102, 103 disposed at the joints of the articulated arm 10 of the robot 1 is sent to the control device 2 via the transmitting-receiving device 13 of the robot 1.

The processing unit 21 of the control device 2 causes a torque sensor offset amount calculation part 211 to use the output data sent from the torque sensors 101, 102, 103 of the robot 1 to calculate an offset amount of each of the torque sensors. Then, a torque sensor deterioration degree determination part 212 uses the calculated offset amount of each of the torque sensors to determine a color that is to be displayed on the display device 3 and that represents a degree of deterioration of each of the torque sensors.

Pieces of data pertaining to the output values of the torque sensors, which have been sent from the robot 1 to the control device 2, the offset amounts of the torque sensors, which have been calculated by the torque sensor offset amount calculation part 211 of the processing unit 21 of the control device 2, and a result of determination by the torque sensor deterioration degree determination part 212 of the processing unit 21 of the control device 2 are sent to the display device 3 via the transmitting-receiving unit 23. The pieces of data sent to the display device 3 are sent to a display part 31 via a transmitting-receiving part 32, and a torque value display part 311 and a torque sensor deterioration degree display part 312 of the display part 31 perform displaying based on the pieces of data that have been sent.

Next, a method of calculating (identifying) an offset amount of each of the torque sensors 101, 102, 103 will now be described herein. The method of identifying an offset amount is based on data of arm positions and output torque of the torque sensors, which are acquired at a plurality of locations by causing the articulated arm 10 of the robot 1 to move about only one axis (by causing only one arm to move). Specifically, operation and calculation described below are performed.

When the articulated arm 10 of the robot 1 is caused to move about only one axis to change a position of an arm, torque that is in balance with gravity occurs, according to loads at a position of the center of gravity of the arm, the other arms coupled to the arm, and respective front ends, on the arms about respective rotation axes at the positions of the arms. Or, no torque occurs on one of the arms, which is at a standstill and is free from the torque that occurs due to gravity. Therefore, an output T of each of the torque sensors is represented by Equation (1) described below, when an offset amount of each of the torque sensors is represented by D, and an arm position is represented by e.

[Mathematical Equation 1]

$$T = M \cdot \sin(\theta + \alpha) + D \qquad \text{Equation (1)}$$

Note herein that M represents a maximum value of gravitational torque applied to each of the arms, and α represents an offset in phase according to the position of the center of gravity of each of the arms, for example.

Then, changing θ of the arm position and recording θ, T are performed a plurality of times, and acquired data is used to identify D with a least-square method. To use the least-square method Equation (1) is changed to Equation (2).

[Mathematical Equation 2]

$$T = M1 \cdot \sin\theta + M2 \cdot \cos\theta + D \qquad \text{Equation (2)}$$

Note herein that $M1 = M \cdot \cos\alpha$, and $M2 = M \cdot \sin\alpha$.

Figure 3:
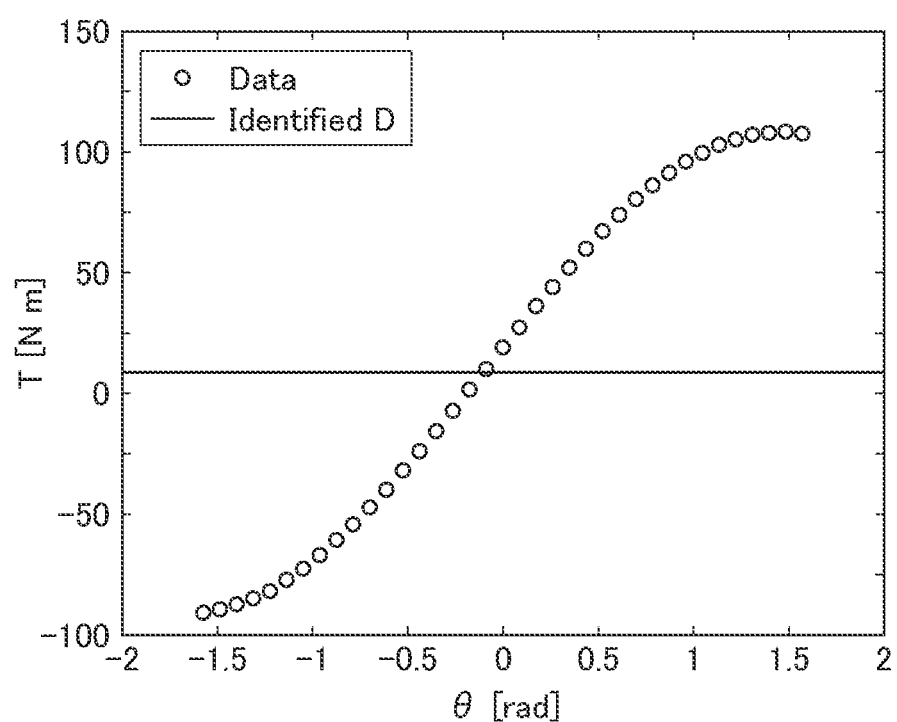
FIG. 3 is a graph illustrating an example of identification of offset amount.
Figure 4:
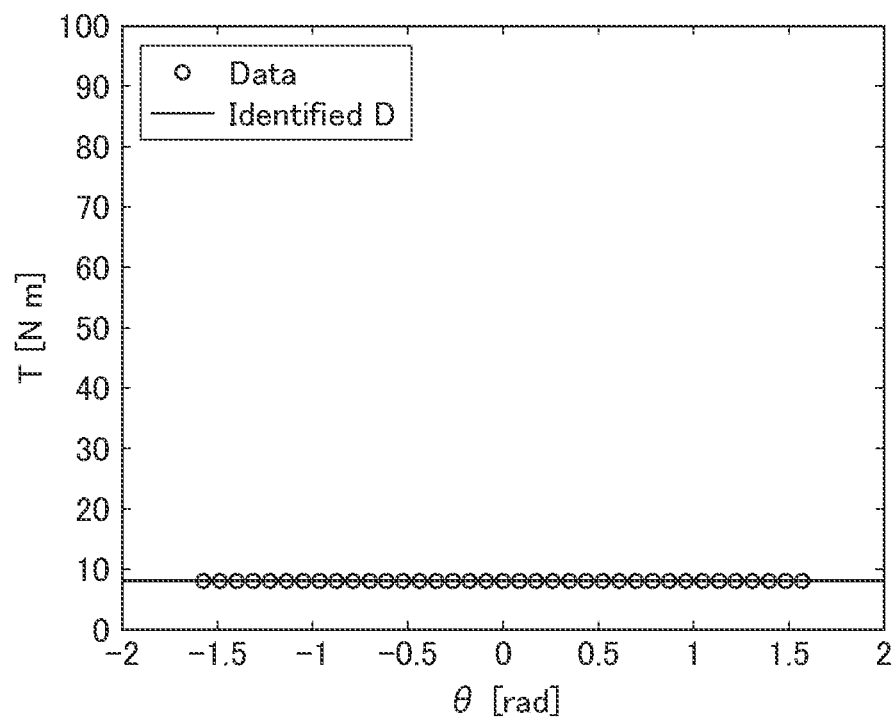
FIG. 4 is a graph illustrating an example of identification of offset amount of an arm to which torque that occurs due to gravity is not applied.

An example when this equation is used as a model to identify D using pieces of data of acquired θ, T is illustrated in FIG. 3. In the graph in FIG. 3, ○ represents each of the pieces of data of acquired θ, T, and a horizontal line (-) represents the identified offset amount D. Furthermore, as an identification example, an example of identifying an arm to which torque that occurs due to gravity is not applied is illustrated in FIG. 4.

Figure 5:
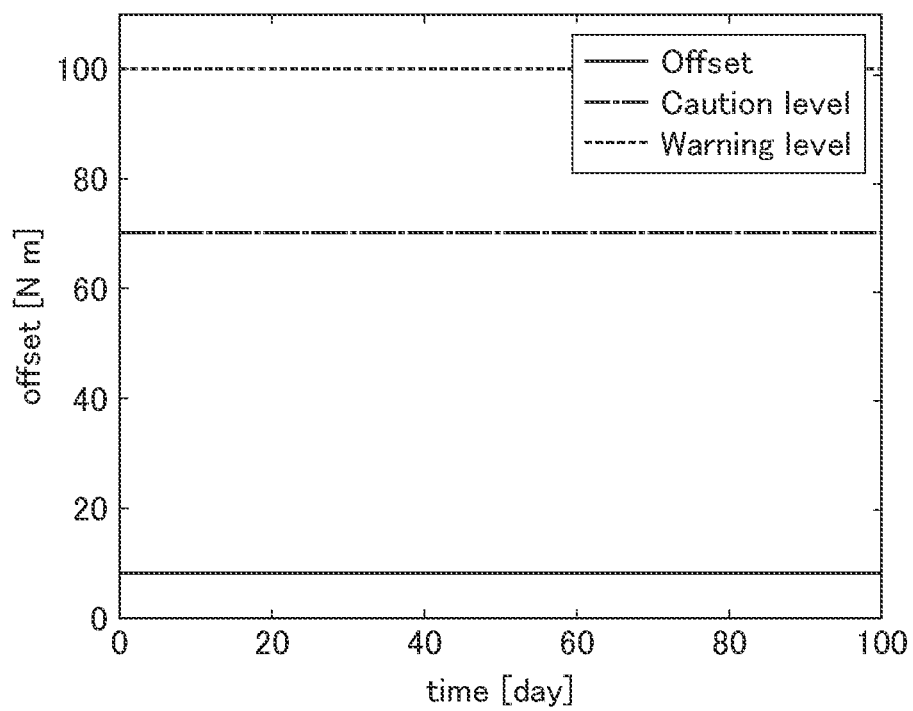
FIG. 5 is a graph illustrating a caution level and a warning level pertaining to the degree of deterioration.

Next, a method of determining a degree of deterioration of each of the torque sensors 101, 102, 103 from the offset amount D of each of the torque sensors 101, 102, 103, which has been identified (calculated) as described above, will now be described herein. Determining a degree of deterioration of each of the torque sensors 101, 102, 103 is performed by periodically performing a self-test, separately from movement under normal operation of the robot. In the self-test, each arm is solely caused to move, and arm positions (angles) and output torque of each of the torque sensors at a plurality of locations are recorded. The values in each of the pieces of the recorded data are assigned into Equation (2) described above to calculate an offset amount of each of the torque sensors 101, 102, 103 with the least-square method. Then, warning and caution threshold values are predetermined for the torque sensors 101, 102, 103, and, when an offset amount exceeds the threshold values, it is determined that the level of warning or caution has been reached. An example graph illustrating the references for warning and caution, in which offset amounts are recorded, is illustrated in FIG. 5.

It is necessary that the torque sensor deterioration degree display part 312 of the display part 31 of the display device 3 knows positions of the torque sensors 101, 102, 103 in the main body of the robot 1 to display the degrees of deterioration of the torque sensors 101, 102, 103 on an outline diagram of the main body (the articulated arm 10 and the body 11) of the robot 1. The positions of the torque sensors 101, 102, 103 are already known, because they are contained in the design information. Then, the positions are also stored, as parameters pertaining to the mechanism, in control software stored in the storage unit 22 of the control device 2. Note that the arms of the articulated arm 10 of the robot 1 are each allowed to have a coordinate system to represent each of the positions of the torque sensors 101, 102, 103 by a coordinate in the coordinate system. The positions of the arms of the articulated arm 10 are also regarded as known information in the control software, and the positions at where the torque sensors 101, 102, 103 are assembled to the arms are also stored in the control software, allowing the torque sensor deterioration degree display part 312 of the display part 31 of the display device 3 to display the positions at where torque sensors 101, 102, 103 are present on the outline diagram of the robot 1.

Next, an embodiment of displaying, on the display device 3, a result of determination of a degree of deterioration of each of the torque sensors 101, 102, 103 will now be described herein.

With the method described above, a torque offset amount is detected (measured) for each of the torque sensors 101, 102, 103. As a result, for example, when a torque offset amount of the torque sensor 101 is lower than the caution level threshold value, it is determined that the degree of deterioration of the torque sensor 101 has not yet reached the caution level. In that case, nothing is displayed. That is, no warning icon is displayed at the position of the torque sensor 101 on the pictorial figure of the robot 1. On the other hand, for example, when a torque offset amount of the torque sensor 102 is equal to or greater than the caution level threshold value, but is less than the warning level threshold value, it is determined that the degree of deterioration of the torque sensor 102 has not yet reached the warning level, but has reached the caution level. In that case, the warning icon is displayed in yellow at the position of the torque sensor 102 on the pictorial figure of the robot 1. Furthermore, for example, when a torque offset amount of the torque sensor 103 is equal to or greater than the warning level threshold value, and thus is regarded as warning, it is determined that the degree of deterioration of the torque sensor 103 has reached the warning level. In that case, the warning icon is display in red at the position of the torque sensor 103 on the pictorial figure of the robot 1.

Figure 6:
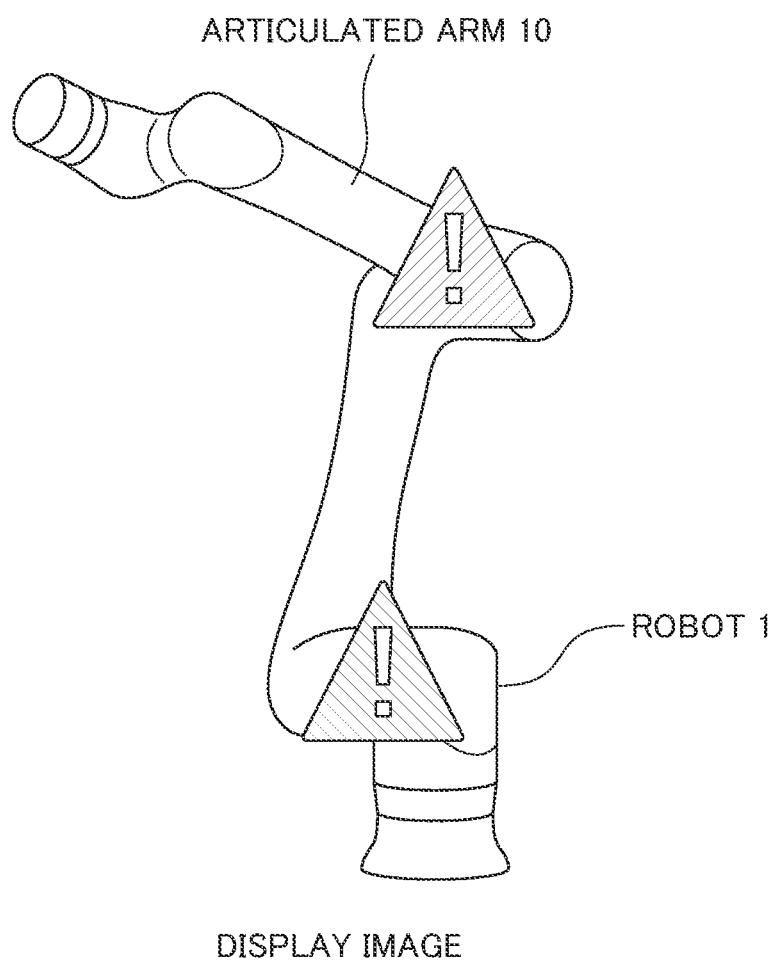
FIG. 6 is a view illustrating a display example of displaying warning icons on a captured image of a robot 1.

An embodiment of the pictorial figure of the robot 1, which is to be displayed on the display device 3, may be in the form of 3D graphics of the robot 1 or a captured image of the robot 1. A captured image of the robot 1, which is adopted as the form of the pictorial figure of the robot 1, is illustrated in FIG. 6. When a torque offset amount of a torque sensor is equal to or greater than the warning level threshold value, the warning icon is displayed at the position of the torque sensor. In the example in FIG. 6, the warning icon that is present on the upper side is displayed in yellow, for example, and the warning icon that is present on the lower side is displayed in red, for example. Note that an embodiment of the display device 3 may be in the form of a transparent display, instead of an ordinary display. That is, when a robot is present within a line of sight of an operator through the transparent display, the warning icon is displayed at a position of projection onto the transparent display, which corresponds to the mounted location of the torque sensor.

Figure 7:
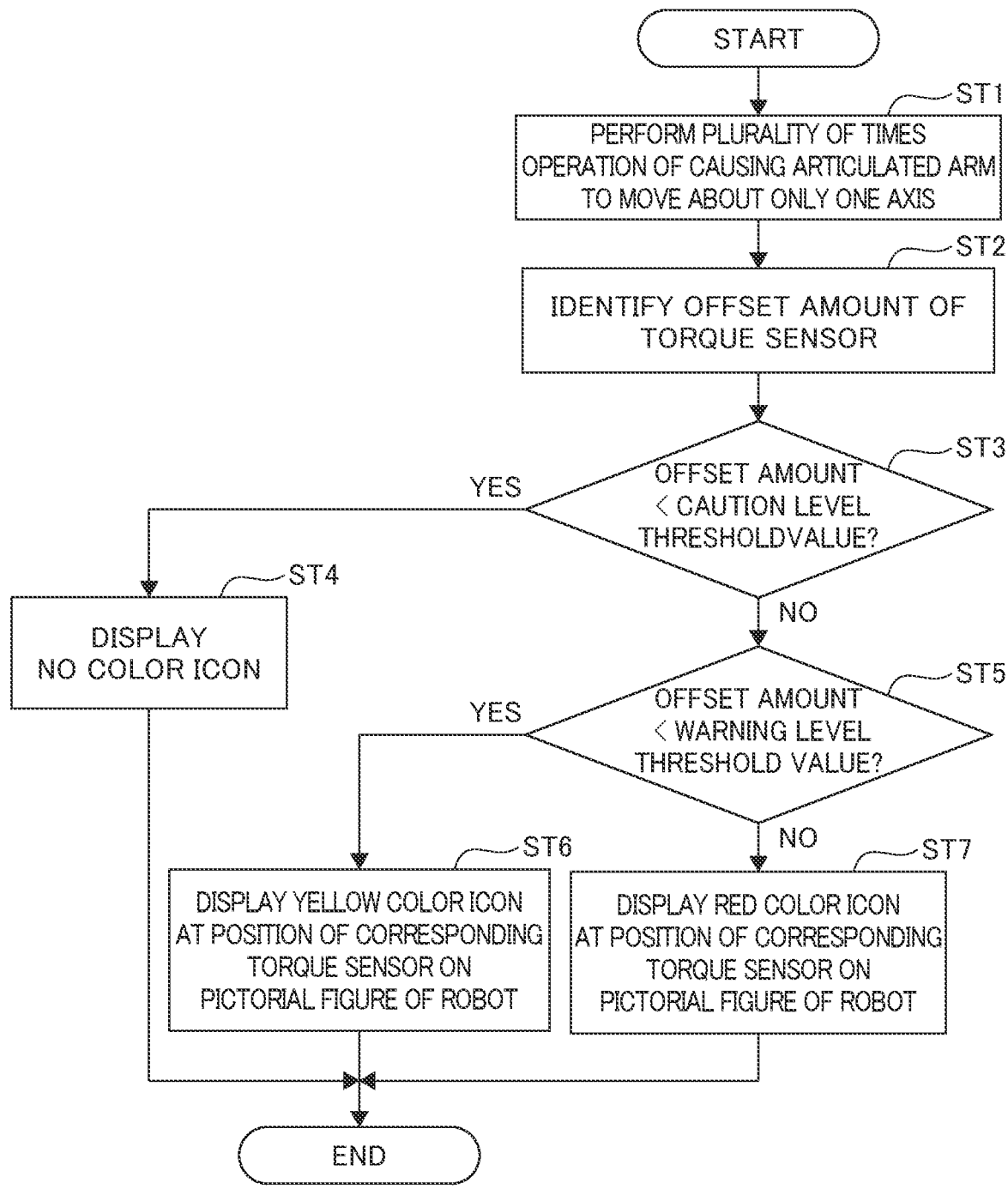
FIG. 7 is a flowchart illustrating steps of displaying a degree of deterioration of a torque sensor according to the present disclosure.

Next, steps of displaying a degree of deterioration in a torque sensor according to the present disclosure are illustrated in the flowchart in FIG. 7. As illustrated in FIG. 7, separately from normal operational maneuvers, the flow starts when a user performs operation of causing the articulated arm 10 of the robot 1 to move about only one axis (to move only one arm) a plurality of times (Step ST1). As a result, the torque sensor offset amount calculation part 211 of the processing device 21 of the control device 2 calculates a torque offset amount for each of the torque sensors 101, 102, 103 (Step ST2).

Next, a degree of deterioration of each of the torque sensors 101, 102, 103 is determined from the calculated torque offset amount of each of the torque sensors 101, 102, 103. The results of determination are then displayed. Specifically, the torque sensor deterioration degree display part 312 of the display part 31 of the display device 3 displays color icons at the positions of the torque sensors 101, 102, 103 on the outline diagram of the robot 1 to display, by respective display colors, the degrees of deterioration.

It is first determined whether the calculated torque offset amount of each of the torque sensors 101, 102, 103 has not yet exceeded the caution level threshold value and is less than the caution level threshold value (Step ST3). When a result of determination is YES, i.e., the offset amount is less than the caution level threshold value, it is determined that the degree of deterioration has not yet reached the caution level, and no color icon is displayed at the position, on the outline diagram of the robot 1, of each of the torque sensors 101, 102, 103 having undergone the determinations (Step ST4). Then the flow ends.

When a result of determination at Step ST3 is NO, i.e., when the offset amount is equal to or greater than the caution level threshold value, then it is determined whether the calculated torque offset amount of each of the torque sensors 101, 102, 103 has not yet exceeded the warning level threshold value and is less than the warning level threshold value (Step ST5).

When a result of determination at Step ST5 is YES, i.e., when the offset amount is less than the warning level threshold value, it is determined that the degree of deterioration has not yet reached the warning level, but has reached the caution level, and a yellow color icon is displayed at the position, on the outline diagram of the robot 1, of each of the torque sensors 101, 102, 103 having undergone the determinations (Step ST6). Then the flow ends.

When a result of determination at Step ST5 is NO, i.e., when the offset amount is equal to or greater than the warning level threshold value, it is determined that the degree of deterioration has exceeded the warning level, and a red color icon is displayed at the position, on the outline diagram of the robot 1, of each of the torque sensors 101, 102, 103 having undergone the determinations (Step ST7). Then the flow ends.

As described above, with the robot control device according to the present disclosure, it is possible to allow a user to intuitively recognize, at a glance, by a display color of a color icon on an outline diagram of a robot, information regarding a deteriorated torque sensor from among torque sensors at the joints of an articulated arm of the robot and the degree of deterioration of the deteriorated torque sensor.

Then, for an outline diagram of a robot, it is possible to select one of various forms such as 3D graphics of a robot and a captured image of a robot, allowing a user to recognize, at a glance, a position and degree of deterioration of a deteriorated torque sensor in an easily viewable external form of the robot, according to the form of the robot and the characteristics of a display device.

Furthermore, for the form of a display device, it is possible to select a transparent display, instead of ordinary displays such as liquid crystal displays and organic electroluminescent displays (EL), making it possible to recognize, at a glance, a position and degree of deterioration of a deteriorated torque sensor in an easily viewable display state, according to the environment where the robot is used.

The embodiments have been described with regard to implementation of the present invention. However, the present invention is not limited to these embodiments. It is of course possible to implement the present invention in various aspects within a range without departing from the scope of the present invention.

EXPLANATION OF REFERENCE NUMERALS

1 Robot
10 Articulated Arm 101,102,103 Torque sensor
11 Body (of robot)
12 Servo motor
13 Transmitting-receiving device (of robot)
2 Control device
21 Processing unit
211 Torque sensor offset amount calculation part
212 Torque sensor deterioration degree determination part
213 Articulated arm movement teaching part
214 Servo motor operation calculation part
22 Storage unit
23 Transmitting-receiving unit (of control device)
3 Display device
31 Display part
311 Torque value display part
312 Torque sensor deterioration degree display part
33 Transmitting-receiving part (of display device)

The invention claimed is:

1. A robot control device for a robot provided with torque sensors each configured to detect torque of an external force about a joint, the robot control device comprising
a display device configured to display, together with 3D graphics of a main body of the robot, a warning icon in color at a mounted location of a deteriorated torque sensor from among the torque sensors, and to change the color according to a degree of deterioration,
wherein the degree of deterioration is determined based on an offset amount of a torque sensor from among the torque sensors, the torque sensor from among the torque sensors being identified from data of angular positions of arms and output torque of the torque sensors, the angular positions of arms and the output torque being acquired at a plurality of locations by causing the robot to move about only one axis.

2. The robot control device according to claim 1, wherein the offset amount of each of the torque sensors represents an offset amount D of each of the torque sensors, the offset amount D being acquired by:
changing an angular position $\theta$ of each of the arms to measure output torque T;
recording a plurality of pairs of the angular position $\theta$ of each of the arms and the output torque T;
using Equation (1) described below representing a relationship among the angular position $\theta$ of each of the arms, the output torque T, and the offset amount D of each of the torque sensors; and
using a least-square method

[Mathematical Equation 1]

$$T = M \cdot \sin(\theta + \alpha) + D \qquad \text{Equation (1)}$$

where
M represents a maximum value of gravitational torque applied to each of the arms, and
$\alpha$ represents an offset in phase according to a position of a center of gravity of each of the arms.

3. A robot control device for a robot provided with torque sensors each configured to detect torque of an external force about a joint, the robot control device comprising
a display device configured to display, together with an actual captured image of a main body of the robot, a warning icon in color at a mounted location of a deteriorated torque sensor from among the torque sensors, and to change the color according to a degree of deterioration,
wherein the degree of deterioration is determined based on an offset amount of a torque sensor from among the torque sensors, the torque sensor from among the torque sensors being identified from data of angular positions of arms and output torque of the torque sensors, the angular positions of arms and the output torque being acquired at a plurality of locations by causing the robot to move about only one axis.

4. The robot control device according to claim 3, wherein the offset amount of each of the torque sensors represents an offset amount D of each of the torque sensors, the offset amount D being acquired by:
changing an angular position $\theta$ of each of the arms to measure output torque T;
recording a plurality of pairs of the angular position $\theta$ of each of the arms and the output torque T;
using Equation (1) described below representing a relationship among the angular position $\theta$ of each of the arms, the output torque T, and the offset amount D of each of the torque sensors; and
using a least-square method

[Mathematical Equation 1]

$$T = M \cdot \sin(\theta + \alpha) + D \qquad \text{Equation (1)}$$

where
M represents a maximum value of gravitational torque applied to each of the arms, and
$\alpha$ represents an offset in phase according to a position of a center of gravity of each of the arms.

5. A robot control device comprising an augmented reality display device configured to display, when a robot provided with torque sensors each configured to detect torque of an external force about a joint is present within a field of view,
at a position of projection onto a transparent display, a position corresponding to a mounted location of a deteriorated torque sensor from among the torque sensors of the robot, a warning icon in color, and to change the color according to a degree of deterioration.

6. The robot control device according to claim 5, wherein the degree of deterioration is determined based on an offset amount of a torque sensor from among the torque sensors, the torque sensor from among the torque sensors being identified from data of angular positions of arms and output torque of the torque sensors, the angular positions of arms and the output torque being acquired at a plurality of locations by causing the robot to move about only one axis.

7. The robot control device according to claim 6, wherein the offset amount of each of the torque sensors represents an offset amount D of each of the torque sensors, the offset amount D being acquired by:
changing an angular position $\theta$ of each of the arms to measure output torque T;
recording a plurality of pairs of the angular position $\theta$ of each of the arms and the output torque T;
using Equation (1) described below representing a relationship among the angular position $\theta$ of each of the arms, the output torque T, and the offset amount D of each of the torque sensors; and
using a least-square method

[Mathematical Equation 1]

$$T = M \cdot \sin(\theta + \alpha) + D \qquad \text{Equation (1)}$$

where
M represents a maximum value of gravitational torque applied to each of the arms, and
$\alpha$ represents an offset in phase according to a position of a center of gravity of each of the arms.

* * * * *